United States Patent [19]

Gilch et al.

[11] Patent Number: 4,999,407
[45] Date of Patent: Mar. 12, 1991

[54] HOT-MELT POLYURETHANE ADHESIVE COMPOSITIONS

[75] Inventors: Heinz G. Gilch, Bad Homburg; Karl-Heinz Albert, Oberursel, both of Fed. Rep. of Germany

[73] Assignee: Bostik, Inc., Middletown, Mass.

[21] Appl. No.: 347,124

[22] Filed: May 4, 1989

[30] Foreign Application Priority Data

May 6, 1988 [GB] United Kingdom ............... 8810701

[51] Int. Cl.$^5$ .................... C08G 18/10; C08G 18/70
[52] U.S. Cl. .................................. 525/457; 525/453; 525/458; 528/60; 528/67
[58] Field of Search ............... 525/453, 457, 458; 528/60, 66, 67

[56] References Cited

U.S. PATENT DOCUMENTS 3,509,232 4/1970 Schollenberger .................. 525/440

FOREIGN PATENT DOCUMENTS 0196749 10/1986 European Pat. Off. .
1385340 2/1975 United Kingdom .

OTHER PUBLICATIONS

"Shaping Reactive Hot Melts Using LMW Copolyesters" paper by Adhesives Age, Authors Hans F. Huber and Hartmut Muller dated Nov. 1987.
Moisture Curing Hot Melts, a paper from "Hot Melt-/TAPPI Symposium" by Dr. Hans Huber and Dr. Hartmut Muller.

*Primary Examiner*—John C. Bleutge
*Assistant Examiner*—Thomas Hamilton, III
*Attorney, Agent, or Firm*—David G. Conlin; Gregory D. Williams

[57] ABSTRACT

Quick-setting hot-melt adhesive compositions comprising a mixture of at least two polyurethane prepolymer, each providing a different glass transition point to said composition. Preferably one prepolymer has a tg above room temperature and one prepolymer has a tg below room temperature. These adhesive mixtures show an attractive blend of properties, giving quick setting bonds which are flexible immediately after bonding and which after curing have excellent heat stability and resistance to hydrolytic and chemical attack.

11 Claims, No Drawings

HOT-MELT POLYURETHANE ADHESIVE COMPOSITIONS

BACKGROUND OF THE INVENTION

The present invention relates to quick-setting, hot-melt adhesive compositions which are solvent-free, reactive compositions which can be applied at relatively low temperatures. Hitherto hot-melt materials including EVA, polyester or polyamide have been used for fast bonding processes and automatic adhesive application requiring quick setting bonds but these have necessitated high application temperatures.

For example, solvent-free reactive polyurethane hot-melt materials, such as are disclosed in DOS 2 609 266, solve the problem of high application temperatures by application of a low-viscosity hot melt at 100° C. which sets by crystallisation. Such adhesive systems exhibit good thermolytic and hydrolytic stability when chain-extended and cross-linked by atmospheric moisture. However, bonds provided by these crystallising polyurethane prepolymers have low elasticity before curing resulting in low initial peel strength immediately after bonding and have a lower setting rate which depends on the crystallisation rate of the polyester used. Other reactive crystalline polyurethane hot melts, such as the adhesive compositions disclosed in DOS 3 236 313, do show a better elasticity in the uncured state but have an undesirably high application temperature (approaching those of conventional hot-melt materials) and exhibit pot life problems at application. It is accordingly an object of the present invention to provide quick-setting, hot-melt adhesive compositions comprising polyurethane pre-polymers which have improved flexibility immediately after bonding whilst being heat stable and resistant to hydrolytic and chemical attack after curing.

SUMMARY OF THE INVENTION

It is a further object of the invention to provide such quick-setting adhesive compositions which can be applied at lower temperatures than conventional hot-melt materials.

According to the present invention a quick setting, hot-melt polyurethane adhesive composition comprises a mixture of at least two amorphous polyurethane pre-polymers, each polyurethane prepolymer providing a different glass transition point for said composition. Preferably the first polyurethane prepolymer has a glass transition point above room temperature and the second polyurethane prepolymer has a glass transition point below room temperature.

Such a composition comprising two polyurethane prepolymers of differing glass transition point can be applied at a lower temperature than is usual for conventional hot-melt materials, gives quick setting bonds which are flexible immediately after bonding, and which after curing have excellent heat stability and resistance to hydrolytic and chemical attack.

The separate polyurethane polymers do not give satisfactory properties when used in an adhesive composition. A prepolymer with a glass transition point above room temperature sets quickly on cooling from the application temperature but is unacceptably brittle immediately after bonding. A prepolymer with a glass transition point below room temperature may be applied at a lower temperature, even at room temperature, but remains tacky and solidifies only on curing to give an elastic film. Bonds with these prepolymers are flexible at room temperature and temperatures down to the transition point of the prepolymer.

A mixture of two prepolymers as defined gives a desirable combination of the properties, having flexible bonds even at low temperatures.

The viscosity and setting time of the adhesives, its tackiness and the toughness of the bonds is determined by the ratio of the two prepolymers. The viscosity of the adhesive and the application temperatures which forms bonds with the adhesive is determined by the glass transition points of the prepolymers. Thus an adhesive can be 'tailored' for a desired combination of properties.

It is preferred to use two prepolymers which are incompatible since this provides especially good mechanical properties. Preferable prepolymers are used having molecular weights greater than 1500. Polymers of lower molecular weight are often compatible so that only one glass transition point can be observed. Preferably the two polyols used should have different chemical structures.

Adhesive compositions according to the present invention may be prepared either by mixing the two separately prepared prepolymers or by preparation of the second prepolymer in the first prepolymer.

Bonds made with adhesives according to the invention are flexible immediately after setting as can be demonstrated by peel strength measurements. After curing the bonds are tough and flexible down to the lower glass transition point and show good bond strength even at temperatures above the higher glass transition point.

Thus the properties of an adhesive composition according to the invention may be varied both by adjusting the ratio of the two polymers and by changing the composition of one or both of the prepolymers.

If more prepolymer with the higher glass transition point is used, the adhesive is more viscous and the bonds are tougher and more resistant against higher temperatures and hydrolysis. At lower temperatures they are more brittle. If more prepolymer with the lower glass transition point or a different prepolymer with a lower tg is used, the adhesive becomes less viscous and the bonds are softer and more flexible. The lower glass transition temperature determines the lowest temperature at which bonds are flexible, whilst the higher glass transition temperature determines application temperature, viscosity and setting rate.

The polyurethane prepolymer with the higher glass transition temperature consists of a polyol (preferably a polyester diol) and a polyisocyanate and may optionally contain plasticisers for lower viscosity. The polyol should have a molecular weight of more than 1000, preferably more than 2000, is preferably solid at room temperature and has a glass transition point above 20° C.

For lower viscosity and lower application temperatures, the tg should be below 120° C., preferably not higher than 80° C.

The polyol used to prepare prepolymers may be a copolymer of aromatic acids (such as isophthalic or terephthalic acid) and/or aliphatic acids (such as adipic, acelaic or sebacic acid) and low molecular diols (such as ethylene glycol, butane diol, hexane diol etc). The polyisocyanate used is preferably an aromatic diisocyanate such as 4.4' diphenyl methane diisocyanate or 2.4' toluene diisocyanate. However, aliphatic diisocyanates may also be used for polyurethane prepolymers with high u.v. stability. The prepolymer should be prepared with a NCO:OH ratio of 1.1 to 6.0, preferably 2.0 to 3.5 and at temperatures above the tg of the polyol, preferably between 80° and 130° C.

The polyurethane prepolymer with the lower glass transition temperature is also prepared from a polyol and a polyisocyanate. The polyol may be a linear or slightly branched polyester, a polyether or another OH-terminated polymer. Particular polyesters such as polycaprolactones or polycarbonates may also be used.

Preferably polyesterdiols are used have a molecular weight greater than 1000, preferably above 2000. Their glass transition temperature is preferably lower than room temperature, more preferably below $-30°$ C. The polyisocyanate is preferably an aromatic diisocyanate such as 4.4' diphenyl methane diisocyanate or 2.4' toluene diisocyanate but aliphatic diisocyanates may also be used. The prepolymer is prepared with a NCO:OH ratio higher than 1 to 6.0, preferably at 1.5–2.0, at temperatures between room temperature and 160° C., preferably between 60° and 100° C.

The mixture may also contain usual adjuncts such as fillers, tackifying resins, catalysts and/or plasticisers. The mixture is usually an opaque solid at room temperature. It is applied at temperatures above the higher tg, preferably between 100° and 140° C.

DETAILED DESCRIPTION OF THE INVENTION

In order that the present invention be better understood, it will now be described in greater detail with reference to preferred Examples and a Comparative Adhesive.

EXAMPLE 1

An adhesive according to the present invention was prepared from a mixture of two separately-prepared polyurethane prepolymers having different glass transition points.

A prepolymer with a lower glass transition point was synthesised from a hydroxyl-terminated, substantially linear polyester from 1.6 hexane diol and a mixture of adipic acid and isophthalic acid with a molecular weight of 3.500 (OH number 33 and acid number 0.4) and 4.4' diphenyl methane diisocyanate in a molar ratio to provide a NCO/OH ratio of 2.0. 86.0 parts by weight of this polyester was melted at 100° C. in a reactor, equipped with an efficient stirrer. 0.25 parts tosyl isocyanate and 13.75 parts diphenyl methane diisocyanate were added to the polyester whilst stirring. After stirring this mixture for 1 hour at 100° C., the product was filled into moisture-proof containers. The prepolymer had a viscosity of 18 Pas at 100° C. and a glass transition point of $-39°$ C.

A prepolymer with a higher tg was prepared from another hydroxyl-terminated, substantially linear polyester having a molecular weight of 5600 (OH number 20 and acid number 0.8) made from a mixture of ethylene glycol, neopentyl glycol and 1.6 hexane diol with a mixture of terephthalic and isophthalic acid. This polyester is reacted with 4.4'- diphenyl methane diisocyanate, in a molar ratio to provide a NCO/OH ratio of 3.5. 84.45 parts by weight of the polyester, being melted at 130° C. in a reactor equipped with an efficient stirrer. 0.25 parts tosyl isocyanate and 15.30 parts diphenyl methane diisocyanate were added to the polyester while stirring. After stirring this mixture for 1 hour at 120° C., the product, which had a glass transition at 34° C., is filled in moisture-proof containers or directly mixed with the prepolymer of lower tg.

The two prepolymers were melted and mixed together at 120° C. with 0.05 parts dibutyl tin dilaurate dissolved in 0.15 parts 'Mesamoll' (RTM) plasticiser. After stirring for 30 minutes at 120° C. this mixture was degassed under reduced pressure at 130° C. for 30 minutes and filled into aluminium cartridges which were then sealed.

At 130° C. (application temperature), the viscosity of the product was measured to be 32 Pas. Differential Scanning Calorimetry (dsc) measurement of this product showed glass transitions at $-30°$ C., $+7°$ C. and $+34°$ C. The upper and lower transitions are due to the respective prepolymers whereas the intermediate transition is due to the formation of some copolymer of the prepolymers.

This adhesive composition sets quickly. Bonds with this adhesive have a good bond strength at lower and higher temperatures as is illustrated in Table 2. They have an improved hydrolytic resistance which is shown by fulfilling the stringent requirements of the German furniture industry (B4/10 test according to DIN 68603; after storage of beechwood bonds 6 hours in boiling water and 2 hours drying at ambient conditions, tensile strength must be higher than 8 N/mm$^2$). (For detailed results see Table 3).

EXAMPLE 2

A adhesive according to the invention was prepared as a one-part formulation.

9.1 parts per weight of 4.4' diphenyl methane diisocyanate and 0.2 parts tosyl isocyanate were melted at 60° C. for 30 minutes under dry nitrogen. 65.5 parts of the molten polyester with a glass transition point of 34° C. same as used in Example 1 were added whilst stirring to provide a NCO/OH ratio of 2.7.

The polyester with the higher tg was a hydroxyl-terminated, substantially linear polyester diol prepared from a mixture of ethylene glycol, neopentyl glycol and 1.6. hexane diol with a mixture of terephthalic and isophthalic acid and had a molecular weight of 5 600 (OH number 20 and acid number 0.8). After stirring this mixture for 30 minutes at 120° C., 3.2 parts of 4.4' diphenyl methane diisocyanate were added. Stirring was continued for 30 minutes. Then 21.8 parts of a polyester with a lower glass transition point are added to provide a NCO/OH ratio of 2.4. This polyester with the lower tg was a hydroxyl-terminated, substantially linear polyester prepared from 1.6 hexane diol and a mixture of adipic acid and isophthalic acid and had a molecular weight of 3 500 (OH number 33 and acid number 0.4). After 30 minutes stirring at 120° C., the mixture was completed by addition of 0.05 parts dibutyl tin dilaurate dissolved in 0.15 parts 'Mesamoll' (RTM) plasticiser. This mixture was stirred for 30 minutes at 120° C. and then degassed under vacuum at 130° C. for 30 minutes. The product was filled into aluminium cartridges which were then sealed.

This product has a viscosity of 91 Pas at 130° C. and of 47 Pas at 150° C. The dsc measurement of this product shows glass transitions at $-17°$ C. and $+32°$ C.

This adhesive composition sets quickly. Bonds with this adhesive exhibit a good bond strength at lower and higher temperatures as is again illustrated in Table 2. They have an improved hydrolytic resistance and again were able to meet requirements set down by the German furniture industry (for results of the B 4/10 test according to DIN 68 603 see Table 3).

COMPARATIVE ADHESIVE

For purposes of comparison, a polyurethane prepolymer hot-melt adhesive was prepared in accordance with DOS 2 609 266. This adhesive is based on a crystallising polyester having a crystalline melting point of 60° C. but showing a single glass transition at −35° C. The properties of initial and final bond strength of the Comparative Adhesive are compared with those of the two Examples of the present invention.

Tests were made with beechwood samples (bonding area 12×25 mm$^2$) for tensile shear strength measurements and canvas samples (bonding area 80×25 mm$^2$) for peel strength measurements. The data are collated in Tables 1-3.

Application temperature was 100° C. for the comparative adhesive and for the two adhesives according to the Examples was 130° C.

TABLE 1

Initial Bond Strength (Peel strength as N/cm)

| | (a) after 30 sec | (b) after 1 min | (c) after 5 min |
|---|---|---|---|
| Comparative Adhesive | 0 | 0 | 2 |
| EXAMPLE 1 | 17 | 23 | 30 |
| EXAMPLE 2 | 32 | 47 | 51 |

TABLE 2

Final Bond Strength (fully cured after 24 hours at Room Temperature)

| | Peel Strength (N/cm) | Tensile Shear Strength (N/mm$^2$) | | | |
|---|---|---|---|---|---|
| | | (a) at room temperature | (b) −20° C. | (c) 100° C. | (d) 150° C. |
| Comparative Adhesive | 53 | 10 | 13 mb | 1.0 | 0.1 |
| EXAMPLE 1 | 54 | 9 | 12 mb | 2.8 | 0.8 |
| EXAMPLE 2 | 72 | 10 | 12 mb | 2.5 | 0.7 | mb - material breakdown

TABLE 3

Hydrolysis resistance

Tensile shear strength of beechwood bonds after 6 hours in boiling water followed by 2 hours in cold water and then seven days drying at 23° C./50% r.h. (B 4/10 test according to DIN 68603)

TABLE 3

Hydrolysis resistance
Tensile shear strength of beechwood bonds after 6 hours in boiling water followed by 2 hours in cold water and then seven days drying at 23° C./50% r.h. (B 4/10 test according to DIN 68603)

| Comparative pu Adhesive | 6.6 N/mm$^2$ |
|---|---|
| EXAMPLE 1 | 8.1 N/mm$^2$ |
| EXAMPLE 2 | 9.5 N/mm$^2$ |

I claim:

1. A quick setting, hot-melt polyurethane adhesive composition comprising:
   a mixture of at least two amorphous polyurethane prepolymers, wherein at least one polyurethane prepolymer has a glass transition point above room temperature and at least one polyurethane prepolymer has a glass transition point below room temperature.

2. A polyurethane adhesive composition according to claim 1, wherein the two polyols used to prepare the two prepolymers have different chemical structures.

3. A polyurethane adhesive composition according to claim 1 wherein the prepolymers used have molecular weights greater than 1500.

4. A polyurethane adhesive composition according to claim 1 wherein the prepolymers are prepared from polyols and polyisocyanates at a NCO:OH ratio of about 1.1 to 6.0 at a temperature above the tg of the polyol.

5. A polyurethane adhesive composition according to claim 4 comprising polyols having a molecular weight of greater than about 1000 and a glass transition point above 20° C.

6. A polyurethane adhesive composition according to claim 4 wherein the glass transition point of the polyols is below about 120°.

7. A polyurethane adhesive composition according to claim 4 wherein the prepolymers are prepared at a temperature of between about 80° and 130° C.

8. A polyurethane adhesive composition according to claim 1 wherein the prepolymers are prepared from polyols and polyisocyanates at a NCO:OH ratio of about 2.0 to 3.5 at a temperature about the tg of the polyol.

9. A polyurethane adhesive composition according to claim 8 wherein the prepolymers are prepared at a temperature of between about 80° and 130° C.

10. A polyurethane adhesive composition according to claim 4 comprising polyols having a molecular weight of greater than about 2000 and a glass transition point about 20° C.

11. A polyurethane adhesive composition acocording to claim 4 wherein the glass transition point of the polyols is less than about 80° C.

* * * * *